United States Patent [19]

Kimura

[11] Patent Number: 4,868,819

[45] Date of Patent: Sep. 19, 1989

[54] ACCESS CONTROL APPARATUS

[75] Inventor: Shuichi Kimura, Tokyo, Japan

[73] Assignee: Sony Corporation, Tokyo, Japan

[21] Appl. No.: 149,513

[22] Filed: Jan. 28, 1988

[30] Foreign Application Priority Data

Feb. 2, 1987 [JP] Japan ................................ 62-023165

[51] Int. Cl.$^4$ .............................................. G11B 5/55
[52] U.S. Cl. ....................................... 369/32; 369/33; 369/44
[58] Field of Search ....................... 369/32, 44, 45, 46, 369/33

[56] References Cited

U.S. PATENT DOCUMENTS

| 4,464,689 | 8/1984 | Probst | 360/78 |
| 4,479,194 | 10/1984 | Fogg et al. | 364/900 |
| 4,488,098 | 12/1984 | Shimonou | 318/561 |
| 4,677,507 | 6/1987 | Elliott | 360/78.07 |
| 4,774,699 | 9/1988 | Giddings | 369/32 |
| 4,779,252 | 10/1988 | Custers et al. | 369/32 |

Primary Examiner—Steven L. Stephan

Attorney, Agent, or Firm—Ronald P. Kananen

[57] ABSTRACT

An access control apparatus for use with a disc drive having a head provided for movement with respect to tracks on a disc to produce a reproduced signal containing a data signal. The access control apparatus includes a drive device for moving the head in a direction radially of the disc to perform rapid access from one track to a desired track. A traverse detector is provided for producing traverse detection pulses in response to the data signal. The traverse detector includes a trigger signal generator responsive to the data signal for producing trigger pulses for respective cycles of the data signal having a magnitude greater than a predetermined value and a timer responsive to each of the trigger pulses for changing to a first state. The timer returns to a second state a predetermined time afer each the trigger pulse occurs. A counter counts the traverse detection pulses to accumulate a count corresponding to the number of tracks traversed by the head. The drive device is controlled in accordance with the count of the counter.

5 Claims, 6 Drawing Sheets

ACCESS CONTROL APPARATUS

BACKGROUND OF THE INVENTION

This invention relates to an access control apparatus for use with a disc drive having a head provided for movement with respect to recording tracks formed on a disc to produce a reproduced signal.

Access control apparatus have been proposed for controlling the movement of the head in a direction radially of the disc to perform access from one recording track to a desired recording track. Accurate access to the desired recording track requires accurate counting of the number of recording tracks traversed by the head. For this reason, a counter is used for counting traverse detection pulses to accumulate a count correspoonding to the number of recording tracks traversed by the head. It is the current practice to produce the traverse detection pulses by processing the reproduced signal outputted from the head. A serious problem which would occur with this type of access control apparatus is that noise is combined with the traverse detection pulses, causing an error introduced into the accumulated count of the counter when the head traverse speed increases to an extent for the purpose of rapid access to the desired recording track.

SUMMARY OF THE INVENTION

A main object of the invention is to provide an improved access control apparatus which permits rapid access from one recording track to a desired recording track with high accuracy.

It is another object of the invention to provide an access control apparatus which can produce traverse detection pulses without noise combined therewith even when the head moves at high speeds for rapid access to a desired recording track.

There is provided, in accordance with the invention, an access control apparatus for use with a disc drive having a head provided for movement with respect to tracks on a disc to produce a reproduced signal containing a data signal. The access control apparatus comprises means responsive to a control signal for moving the head in a direction radially of the disc to perform access from one track to another track, first traverse detector means responsive to the data signal contained in the reproduced signal fed thereto from the head for producing traverse detection pulses, a counter for counting the traverse detection pulses to accumulate a count corresponding to the number of tracks traversed by the head, and means for producing the control signal in accordance with the count of the counter. The traverse detector includes means responsive to the data signal for producing trigger pulses for respective cycles of the data signal having a magnitude greater than a predetermined value and a timer responsive to each of the trigger pulses for changing to a first state. The timer returns to a second state a predetermined time after each time the trigger pulse occurs. Preferably, the predetermined value set in the timer is slightly longer than a longest possible period of the data signal.

In one aspect of the invention, the access control apparatus further includes means for detecting the speed of movement of the head, second traverse detector means including a first low pass filter having a first time constant, the first low pass filter having an input coupled to the reproduced signal for producing a first filtered signal, a second low pass filter having a second time constant slower than the first time constant, the second low pass filter having an input coupled to the reproduced signal for producing a second filtered signal, and means for producing second traverse detection pulses each of which is produced when the first filtered signal is greater than the second filter signal, and a switching circuit including means for coupling the first traverse detection pulses to the counter when the speed of movement of the head exceeds a predetermined value and for coupling the second traverse detection pulses to the counter when the speed of movement of the head is less than the predetermined value.

In another aspect of the invention, the access control apparatus further includes means for detecting the speed of movement of the head, a second traverse detector including an integrating circuit having an input coupled to the reproduced signal for producing an integrated signal, and means for producing second traverse detection pulses each of which is produced when the integrated signal is greater than a predetermined value, and a switching circuit including means for coupling the first traverse detection pulses to the counter when the speed of movement of the optical head exceeds a predetermined value and for coupling the second traverse detection pulses to the counter when the speed of movement of the head is less than the predetermined value.

In still another aspect of the invention, there is provided an access control apparatus for use with a disc drive having a head provided for movement with respect to tracks on a disc to produce a reproduced signal containing a data signal. The access control apparatus comprises means responsive to a control signal for moving the head in a direction radially of the disc to perform access from one track to another track, first traverse detector means for producing first traverse detection pulses, second traverse detection means for producing second traverse detection pulses, means for detecting the speed of movement of the head to produce a signal indicative of the detected head speed, switching circuit means for selectively supplying the first or second traverse detection pulses in accordance with the head speed detection signal, a counter for counting the traverse detection pulses fed thereto from the switching circuit means to accumulate a count corresponding to the number of tracks traversed by the head, and means for producing the control signal in accordance with the count of the counter.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

DETAILED DESCRIPTION OF THE INVENTION

Figure 1:
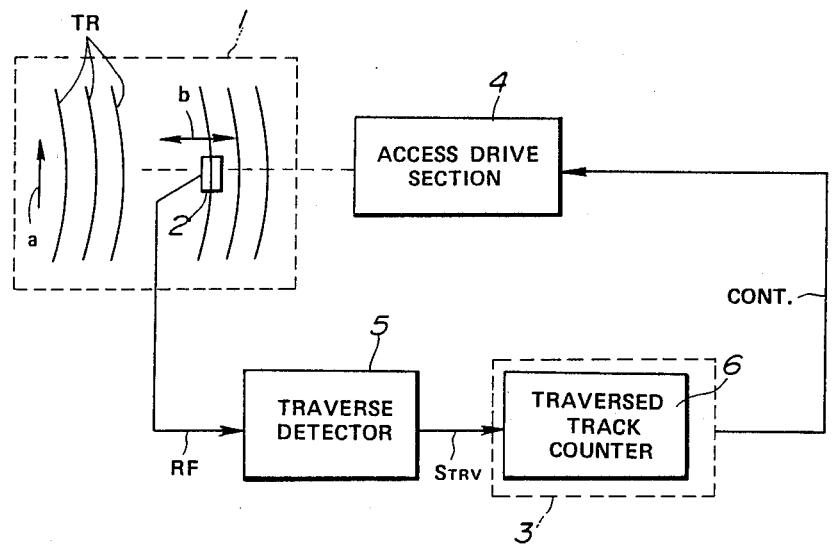
FIG. 1 is a schematic block diagram showing a prior art access control apparatus.

Prior to the description of the preferred embodiment of the present invention, the prior art disc player unit of FIG. 1 is briefly described in order to specifically point out the difficulties attendant thereon.

Referring to FIG. 1, the conventional compact disc (CD) player unit is shown as including an optical head 2 for reading the data recorded on a spiral track TR on an optical disc 1. For this purpose, the optical head 2 applies three laser beams on the optical disc 1 and produces a reproduced signal RF according to the main laser beam and a tracking error signal according to the sub-laser beams reflected by the optical disc 1.

Figure 2:
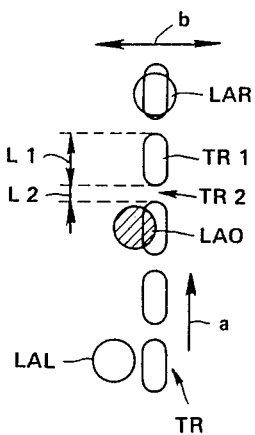
FIG. 2 is an enlarged plan view showing a recording track formed on a disc.

As shown in FIG. 2, the main laser beam LAO and the sub-laser beams LAR and LAL impinge on the optical disc 1 such that the spots formed thereby are arranged substantially along the direction of the recording track TR. The recording track TR is formed by a pit TR1 and mirror sections TR2 having lengths L1 and L2, respectively, selected according to an eight-to-fourteen modulation (EFM) code. The pit and mirror sections TR1 and TR2 have a length ranging from 3T to 11T. Accordingly, the longest length of the pit or mirror sections is represented as 11T.

Returning to FIG. 1, access to a recording track having a predetermined address recorded thereto is made through an access control sectoion 3. The access control section 3 produces a control signal CONT to an access drive section 4 which thereby moves the optical head 2 in a traverse direction b radially of the optical disc 1. During the access mode of operation, the optical head 2 traverses tracks when the optical disc 1 is rotating in the rotational direction a, and the optical head 2 produces a reproduced signal RF, as shown in FIG. 3(A), which contains a data signal DATA modulated by a traverse signal Ltrv. The data signal DATA represents the lengths of the pit and mirror sections TR1 and TR2. It is the practice that the data signal DATA is selected such that its frequency becomes 200 kHz when the pit or mirror section has the longest length 11T. A reference signal Lref corresponds to intensity of the beam reflected by the mirror section TR2. The traverse signal Ltrv is varied by tracks and land between tracks with variations in the intensity of the reflected beam.

The reproduced signal RF is fed to a traverse detection circuit 5. The traverse detection circuit produces a traverse detection pulse $S_{TRV}$ to the access control section 3 each time the optical head 2 traverses one recording track TR. The access control section 3 includes a traversed track counter 6 for counting the number of the traverse detection pulses $S_{TRV}$ fed thereto from the traverse detection circuit 5. The access control section 3 controls the access drive section 4 to move the optical head 2 until the count of the traversed track counter 6 reaches a preset value corresponding to the recording track to which access is required.

Figure 3:
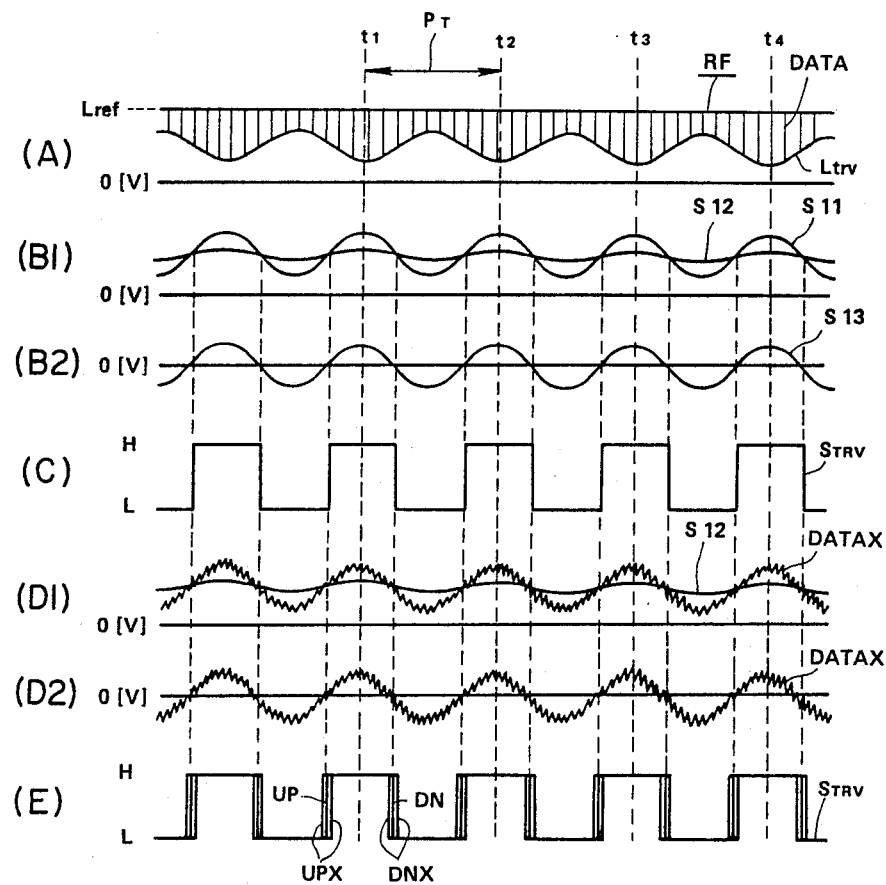
FIG. 3 contains waveforms used in explaining the operation of the prior art access control apparatus.
Figure 4:
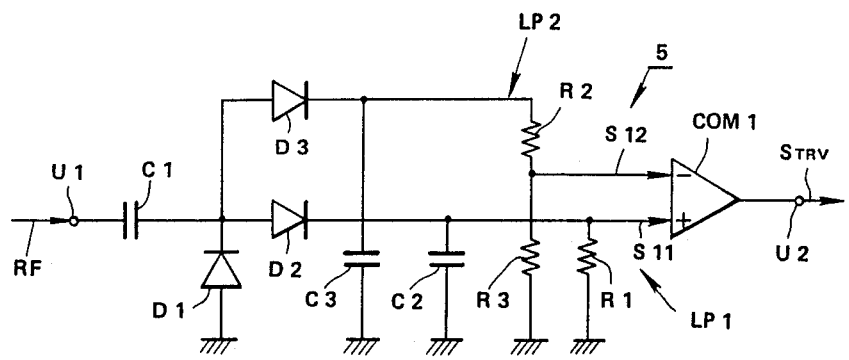
FIG. 4 is a circuit diagram showing one example of the traverse detection circuit of FIG. 1.

Referring to FIG. 4, there is illustrated one type of traverse detection circuit which may be used as the traverse detection circuit 5. This traverse detection circuit includes first and second low pass filters LP1 and LP2. The first low pass filter LP1 includes a diode D2, a capacitor C2 and a resistor R1. The values of the capacitor C2 and the resistor R3 are selected such that the first low pass filter LP1 has a fast time constant. The first low pass filter LP1 has an input coupled through a coupling capacitor C1 to an input terminal U1 to which the reproduced signal RF is applied. The coupling capacitor C1 serves to eliminate the direct-current component from the reproduced signal RF. The output of the first low pass filter LP1 is coupled to the positive input of a comparator COM1. The second low pass filter LP2 includes a diode D3, a capacitor C3 and two resistors R2 and R3 which forms a voltage divider. The values of the capacitor C3 and the resistors R2 and R3 are selected such that the second low pass filter LP2 has a slow time constant. The second low pass filter LP2 has an input coupled through the coupling capacitor C1 to the input terminal U1. The junction of the resistors R2 and R3 is connected to the negative input of the comparator COM1. The time constants of the first and second low pass filters LP1 and LP2 are selected to be sufficiently longer than the period of the data signal DATA contained in the reproduced signal RF so that no pulsation is superimposed on the signals S11 and S21 produced at the outputs of the first and second low pass filters LP1 and LP2. The output signals S11 and S12 are shown in FIG. 3(B1).

As can be seen from FIG. 3(B1), the signal S11, which is outputted from the first low pass filter LP1 having a fast time constant, follows the traverse signal Ltrv contained in the reproduced signal RF (FIG. 3(A)), whereas the signal S12, which is outputted from the second low pass filter LP2 having a slow time constant, is a small signal similar to a signal obtained by averaging the output signal S11. The traverse detection pulse signal $S_{TRV}$ is produced at the output terminal U2 of the comparator COM1 and fed to the travered track counter 6. The traverse detection pulse signal $S_{TRV}$ changes from one of its high and low levels to the other level each time the output signal S11 crosses the output signal S12, as shown in FIG. 3(C). A traverse detection pulse $S_{TRV}$ is produced to cause its leading or trailing edge to count the traversed track counter 6 up by one step each time the optical head 2 traverses a recording rack. Accordingly, the count of the traversed track counter 6 corresponds to the number of the tracks traversed by the optical head 2.

A serious problem which occurs with this type of access control apparaus is that pulsating noise is combined with the traverse detection pulse signal $S_{TRV}$, causing an error which is introduced into the result of the counting operation of the traversed track counter when the optical head traverse speed increases for the purpose of rapid access. The reason for this will be described in greater detail.

As the speed of movement of the optical head 2 in the traverse direction increases, the frequency of the traverse signal Ltrv contained in the reproduced signal RF becomes closer to the frequency (for example, 200 kHz) of the data signal DATA. This means that the time constant of the first low pass filter LP1 provided for the purpose of eliminating the data signal DATA becomes close to the rate of change of the traverse signal Ltrv. As a result, the first low pass filter LP1 cannot remove the data signal DATA completely from the reproduced signal RF and a noise signal DATAX corresponding to the data signal DATA is superimposed on the output signal S11, as shown in FIG. 3(D1). When such a noise signal DATAX is superimposed on the output signal S11, the noise signal crosses the output signal S12 at points before and after the output signal S11 crosses the output signal S12 so that the comparator COM1 will produce noise pulses UPX and DNX as well as a correct traverse detection pulse $S_{TRV}$, causing an error to be introduced into the result of the counting operation of the traversed rack counter 6. It may be considered that this problem can be solved by selecting the first low pass filter LP1 to have such a slow time constant that substantially no noise signal DATAX occurs. However, this solution will suppress not only the noise signal DATAX, but also the output signal S11 to such an extent that the comparator COM1 fails to compare it with the output signal S12.

Figure 5:
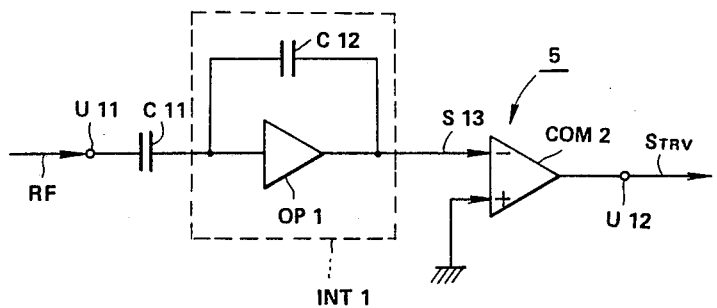
FIG. 5 is a circuit diagram showing another example of the traverse detection circuit of FIG. 1.

Referring to FIG. 5, another type of traverse detection circuit is illustrated which may be used as the traverse detection circuit 5. This traverse detection circuit includes an integration circuit INT1 formed by an operational amplifier OP1 and a capacitor C12. The integrating circuit INT1 has an input coupled through a coupling capacitor C11 to an input terminal U11 to which the reproduced signal RF is applied. The coupling capacitor C11 serves to eliminate the direct-current component from the reproduced signal RF. The integrating circuit INT1 integrates the reproduced signal RF and outputs an integrated signal S13, as shown in FIG. 3(B2). The integrating circuit INT1 is selected to have such a time constant that no pulsation is combined with the output signal S13. The output of the integrating circuit INT1 is coupled to the negative input of a comparator COM2, the positive input of which is connected to ground. The comparator COM2 compares the integrated signal S13 with a reference voltage (in the illustrated case, 0 volt). The traverse detection pulse signal $S_{TRV}$ is produced at the output terminal U12 of the comparator COM2 and fed to the traversed track counter 6. The traverse detection pulse signal $S_{TRV}$ changes from one of its high and low levels to the other level each time the integrated signal S13 crosses the 0 volt reference level, as shown in FIG. 3(c). A traverse detection pulse $S_{TRV}$ is produced to cause its leading or trailing edge to count the travered track counter 6 up by one step each time the optical head 2 traverses a recording track. Accordingly, the count of the traversed track counter 6 corresponds to the number of the tracks traversed by the optical head 2.

The same problem as described previously in connection with the mirror circuit type traverse detection circuit of FIG. 4 occurs with this type of access control apparatus. The reason for this is as follows.

As the speed of movement of the optical head 2 in the traverse direction increases, the frequency of the traverse signal Ltrv contained in the reproduced signal RF becomes closer to the frequency (for example, 200 kHz) of the data signal DATA. This means that the time constant of the integrating circuit INT1 provided for the purpose of eliminating the data signal DATA becomes close to the rate of change of the traverse signal Ltrv. As a result, the integrating circuit INT1 cannot remove the data signal DATA completely from the reproduced signal RF and a noise signal DATAX corresponding to the data signal DATA is superimposed on the output signal S13, as shown in FIG. 3(D2). When such a noise signal DATAX is superimposed on the output signal S13, the noise signal crosses the 0 volt reference level at points before and after the output signal S13 crosses the 0 volt reference level so that the comparator COM2 will produce noise pulses UPX and DNX as well as a correct traverse detection pulse $S_{TRV}$, causing an error to be introduced into the result of the counting operation of the traversed track counter 6. It may be considered that this problem can be solved by selecting the integrating circuit INT1 to have such a slow time constant that substantially no noise signal DATAX occurs. However, this solution will suppress not only the noise signal DATAX, but also the output signal S13 to such an extent that the comparator COM2 fails to compare it with the 0 volt reference level.

Figure 6:
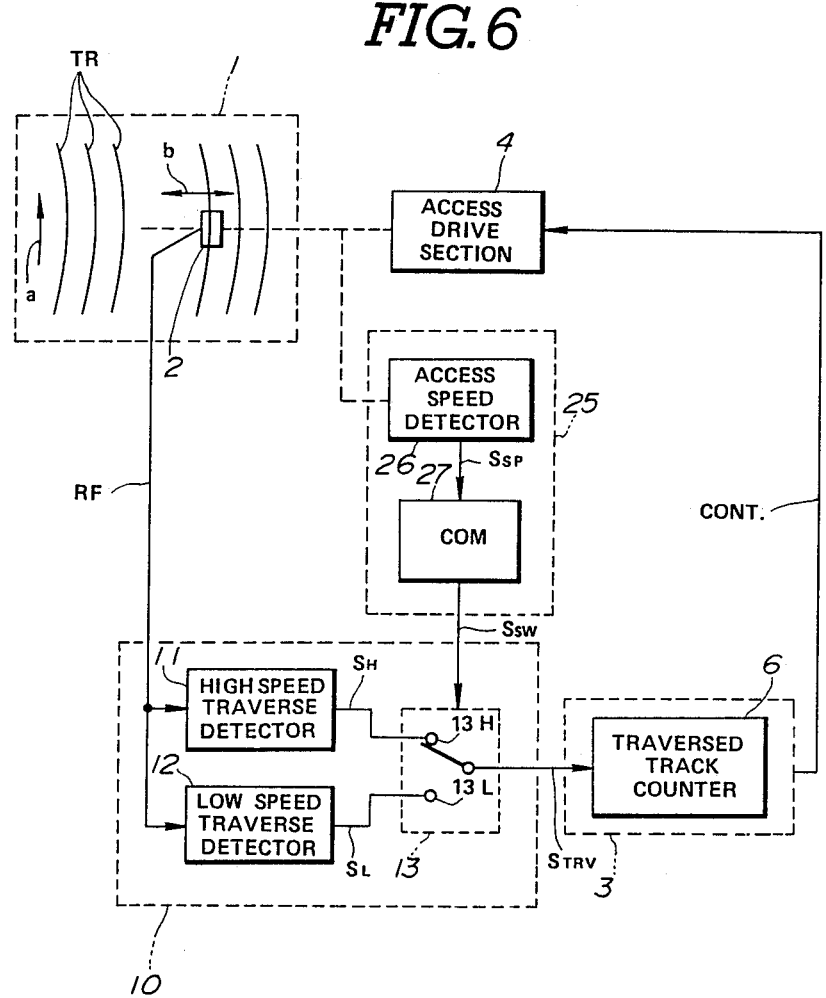
FIG. 6 is a schematic block diagram showing one embodiment of an access control apparatus made in accordance with the invention.

Referring to FIG. 6, there is illustrated one embodiment of an access control apparatus made in accordance with the invention. Like reference numerals have been applied to FIG. 6 with respect to the equivalent components shown in FIG. 1. The access control apparaus includes a traverse detection circuit generally designated by the numeral 10. The traverse detection circuit 10 includes a high-speed-traverse detection circuit 11, a low-speed-traverse detection circuit 12, and a switching circuit 13. The high-speed-traverse detection circuit 11 receives a reproduced signal RF from the optical head 2 and produces a high-speed-traverse detection signal $S_H$. The low-speed-traverse detection circuit 12 receives the reproduced signal RF from the optical head 2 and produces a high-speed-traverse detection signal $S_L$. The high-speed-traverse and low-speed-traverse detection signals $S_H$ and $S_L$ are selectively coupled through the switching circuit 13 to the traversed track counter 6 of the access control section 3.

Figure 7:
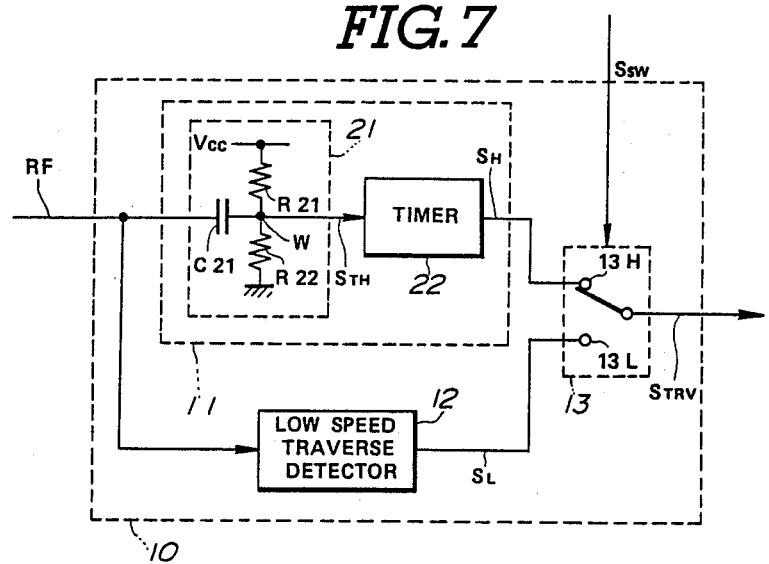
FIG. 7 is a circuit diagram showing the detailed arrangement of the traverse detection circuit of FIG. 6.
Figure 8:
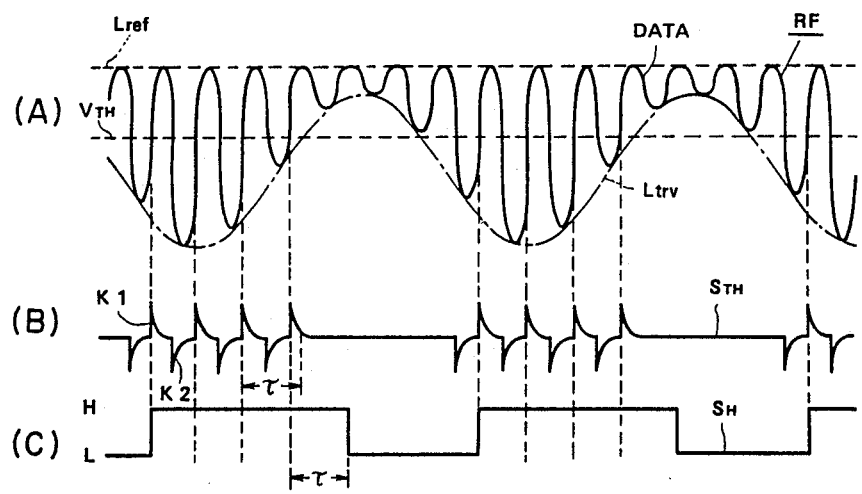
FIG. 8 contains several waveforms used in explaining the operation of the high-speed-traverse detection circuit of FIG. 7.

Referring to FIG. 7, the high-speed-traverse detection circuit 11 includes a threshold circuit 21 having resistors R21 and R22 which form a voltage divider between a power supply designated as Vcc and ground. The junction W of the resistors R21 and R22 is coupled through a capacitor C21 to the reproduced signal RF and also to a timer circuit 22. When the reproduced signal RF, as shown in FIG. 8(A), is applied to the input of the threshold circuit 21, the threshold circuit 21 produces a threshold detection signal $S_{TH}$ in the form of differentiated pulses produced when the data signal DATA included in the reproduced signal RF crosses the threshold voltage $V_{TH}$ determined by the ratio of the values of the resistors R21 and R22, as shown in FIG. 8(A). The threshold detection signal $S_{TH}$ contains first differentiated pulses K1 having a leading or upward edge produced when the data signal DATA crosses the threshold voltage $V_{TH}$ in an increasing direction and second differentiated pulses K2 having a trailing or downward edge produced when the data signal DATA crosses the threshold voltage $V_{TH}$ in a decreasing direction. The threshold detection signal $S_{TH}$ is applied to trigger the timer circuit 22 which may be taken in the form of a retriggerable monostale multivibrator. The timer circuit 22 produces a high-speed-traverse detection signal $S_H$, as shown in FIG. 8(C). In the illustrated case, the timer circuit 22 is triggered into a first state changing the high-speed-traverse detection signal $S_H$ to its high level in response to the leading edge of each of the first differentiated pulses K1, as shown in FIG. 8(C). The timer circuit 22 remains in this first state for a time period $\tau$ preset in the timer circuit 22 and returns to its second state changing the high-speed-traverse detection signal $S_H$ to its low level as long as the threshold detection signal $S_{TH}$ has no leading edge during the time period $\tau$. If the threshold detection signal $S_{TH}$ has another leading edge within the time period $\tau$, the timer circuit 22 is triggered again to start the time period of the first state. As a result, the timer circuit 22 remains in the first state continuously if the threshold detection signal $S_{TH}$ has leading edges produced at intervals of time shorter than the time period $\tau$. It is to be noted that the time period $\tau$ set in the timer circuit 22 is selected to be somewhat longer than the longest possible period (11T) of the data signal DATA. This means that the high-speed-traverse detection signal $S_H$ remains at its high level continuously whenever the data signal DATA has such a level that it crosses the threshold voltage $V_{TH}$.

The low-speed-traverse detection circuit 12 may be taken in the form of one type of traverse detection circuit as shown and described in connection with FIG. 4. In this case, the low-speed-traverse detection signal $S_L$ changes from one of its high and low levels to the other level each time the output signal S11 from the first low pass filter LP1 having a fast time constant crosses the output signal S12 from the second low pass filter LP2 having a slow time constant, as shown in FIG. 3(C). It is, therefore, possible to provide a low-speed-traverse detection signal $S_L$ with no pulsation being combined therewith to the switching circuit 13 in the low-speed-traverse mode of operation where the reproduced signal RF contains a traverse signal Ltrv having a period sufficiently longer than the period of the data signal DATA.

Returning to FIG. 6, the position of the switching circuit 13 is controlled by a switching signal $S_{SW}$ fed thereto from a switching control section 25. The switching control section 25 includes an access speed detection circuit 26 sensitive to the speed of traverse movement of the optical head 2 in a direction b radially of the disc 1 for producing a signal $S_{SP}$ indicative of the sensed access speed. The access speed indication signal $S_{SP}$ is fed to a comparator circuit 27 of the type having positive and negative threshold values $+V_{THW}$ and $-V_{THW}$ set therein. The comparator circuit 27 produces a low-level switching control signal $S_{SW}$ when the access speed indication signal $S_{SP}$ is between the negative threshold value $-V_{THW}$ and the positive threshold value $+V_{THW}$ and a high-level switching control signal $S_{SW}$ when the access speed indication signal $S_{SP}$ is less than the negative threshold value $-V_{THW}$ or greater than the positive threshold value $+V_{THW}$.

Figure 9:
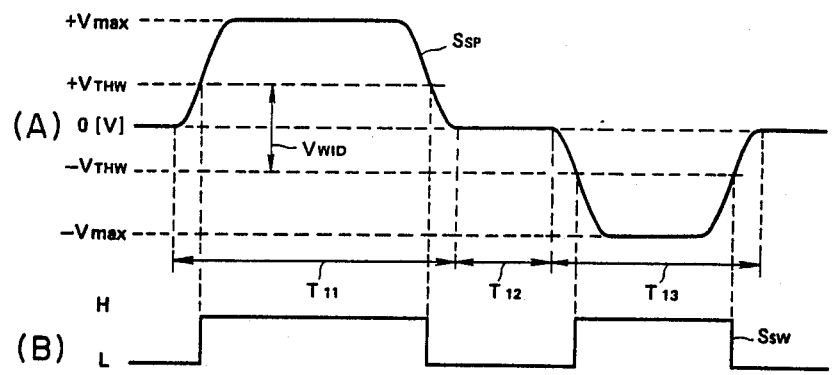
FIG. 9 contains two waveforms used in explaining the operation of the switching circuit of FIG. 6.

The operation of the switching control section 25 will be described in greater detail with reference to FIG. 9. When access is required from one track to a desired track inside the one track, the thread motor contained in the optical head access drive section 4 rotates in a clockwise direction to drive the optical head 2 inwardly of the disc. During such an access mode, the thread motor changes from a stopped condition through an accelerated condition to a steady condition. When the optical head 2 becomes close to the desired track, the thread motor changes from the steady condition through a decelerated condition to a stopped condition. As the thread motor condition changes, the access speed indication signal $S_{SP}$ changes, a shown in FIG. 9A, where T11 is the length of time during which the optical head 2 moves from the one track to the desired inner track. When the optical head 2 is at rest, the access speed indication signal $S_{SP}$ is zero, as shown in FIG. 9(A), and the switching control signal $S_{SW}$ remains at its low level, as shown in FIG. 9(B). After the start of the traverse operation moving the optical head 1 radially inwardly, the access speed indication signal $S_{SP}$ increases toward its positive maximum value $+V_{max}$. When the access speed indication signal $S_{SP}$ reaches the positive threshold value $+V_{THW}$, the switching control signal $S_{SW}$ changes from its low level to its high level, as shown in FIG. 9(B). The access speed indication signal $S_{SP}$ remains at the positive maximum value $+V_{max}$ until the optical head 2 becomes close to the target recording track to which access is required. Thereafter, the access speed indication signal $S_{SP}$ decreases toward zero. When the access speed indication signal $S_{SP}$ reaches the positive threshold value $+V_{THW}$ again, the switching control signal $S_{SW}$ changes from its high level to its low level, as shown in FIG. 9(B). The access speed indication signal $S_{SP}$ reaches zero when the optical head 2 reaches the target recording track to which access is required.

When the disc drive is in a play or record mode, the access speed indication signal $S_{SP}$ remains at zero, as shown in FIG. 9A, where T12 is the length of time of the play or record mode. When access is required from one track to another track outside of the one track, the thread motor rotates in the counter-clockwise direction to drive the optical head 2 outwardly of the disc 1. As the optical head speed changes, the access speed indication signal $S_{SP}$ changes, as shown in FIG. 9A, where T13 is the length of time during which the optical head 2 moves from the one track to the desired outer track. After the start of the traverse operation moving the optical head 1 radially outwardly, the access speed indication signal $S_{SP}$ decreases toward its negative maximum value $-V_{max}$. When the access speed indication signal $S_{SP}$ reaches the negative threshold value $-V_{THW}$, the switching control signal $S_{SW}$ changes to form its low level to its high level, as shown in FIG. 9(B). The access speed indication signal $S_{SP}$ remains at the negative maximum value $-V_{max}$ until the optical head 2 becomes close to the target recording track to which access is required. Thereafter, the access speed indication signal $S_{SP}$ increases toward zero. When the access speed indication signal $S_{SP}$ reaches the negative threshold value $-V_{THW}$ again, the switching control signal $S_{SW}$ changes from its high level to its low level, as shown in FIG. 9(B). The access speed indication signal $S_{SP}$ reaches zero when the optical head 2 reaches the target recording track to which access is required.

The switching control signal $S_{SW}$ is applied to the switching circuit 13 which selectively applies the high-speed-traverse and low-speed-traverse detection signals $S_H$ and $S_L$ as the traverse detection pulse signal $S_{TRV}$ to the traversed track counter 6 of the access control section 3 according to the level of the switching control signal $S_{SW}$. The switching control signal $S_{SW}$ is at its low level when the optical head 2 moves to traverse recording tracks inwardly or outwardly at a slow speed less than a threshold value. In the presence of such a low-level switching control signal $S_{SW}$, the switching circuit 13 is in its first position coupling the low-speed-traverse detection circuit circuit 12 to the traversed track counter 6. On the other hand, the switching control signal $S_{SW}$ is at its high level when the optical head 2 moves to traverse recording tracks inwardly or outwardly at a fast speed greater than the threshold value. In the presence of such a high-level switching control signal $S_{SW}$, the switching circuit 13 is in its second position coupling the high-speed-traverse detection circuit 11 to the traversed track counter 6.

The operation of the access control apparatus used for rapid access from one recording track to another recording track is as follows. At the early stage of the traverse operation of the optical head 2, the optical head 2 moves at a low speed and the access speed indication signal $S_{SP}$ is within the range between the positive and negative threshold values $+V_{THW}$ and $-V_{THW}$. Consequently, the switching control signal $S_{SW}$ is in its low level causing the switching circuit 13 to couple the low-speed-traverse detection signal $S_L$ to the traversed track counter 6. Under this condition, the period of the traverse signal Ltrv contained in the reproduced signal RF is much longer than the period of the data signal DATA. Accordingly, no pulsating noise is introduced into the low-speed-traverse detection signal $S_L$ as described previously in connection with FIG. 4. Similar considerations can be applied to the late stage of the traverse operation during which the optical head 2 moves at a low speed to the target recording track.

At the intermediate stage of the traverse operation of the optical head 2, the optical head 2 moves at a high speed and the access speed indication signal $S_{SP}$ is greater than the positive threshold value $+V_{THW}$ or less than the negative threshold value $-V_{THW}$. As a result, the switching control signal $S_{SW}$ is at its high level causing the switching circuit 13 to couple the high-speed-traverse detection signal $S_H$ to the traversed track counter 6.

This high-speed-traverse detection signal $S_H$ contains a pulse produced each time the optical head 2 traverses one recording track, as shown in FIG. 8(C). The pulse is applied through the switching circuit 13 to count the traversed track counter 6 up by one step. The high-speed-traverse detection signal $S_H$ will be described in greater detail.

When the optical head 2 is traversing a recording track, the data signal DATA has such a great amplitude that it crosses the threshold voltage $V_{TH}$ set in the threshold circuit 21 of the high-speed-traverse detection circuit 11. As described previously, the timer circuit 22 is triggered again by the next differentiated pulse K1 before the lapse of the period of time during which the high-speed-traverse detection signal $S_H$ remains at its high level after one differentiated pulse K1 is applied thereto. Consequently, the high-speed-traverse detection signal $S_H$ remains at its high level for a time period longer than the time period $\tau$, as shown in FIG. 8(C), while the optical head 2 is traversing one recording rack. Although the period of the data signal DATA varies within a range corresponding to the range between 3T to 11T according to the information recorded on the recording track when the optical head 2 is traversing, the high-speed-traverse detection signal $S_H$ remains at its high level as long as the data signal DATA crosses the threshold voltage $V_{TH}$ regardless of the period of the data signal DATA since the period of time $\tau$ during which the high-speed-traverse detection signal $S_H$ remains at its high level after application of one differentiated pulse K1 thereto is selected such that the time period $\tau$ is slightly longer than the period of the longest possible period (corresponding to 11T) of the data signal DATA.

On the other hand, when the optical head 2 is moving between adjacent two recording tracks at the intermediate state of the traverse operation of the optical head 2, the amplitude of the data signal contained in the reproduced signal RF is too small to cross the threshold voltage $V_{TH}$ so that the high-speed-traverse detection signal $S_H$ remains at its low level, as shown in FIG. 8(C).

It is apparent from the foregoing that the invention is effective to avoid introduction of any error into the result of the counting operation by employing the high-speed-traverse detection signal $S_L$ in place of the low-speed-traverse detection signal $S_L$ having a noise signal DTAX superimposed thereon during the high-speed-traverse movement of the optical head 2.

Figure 10:
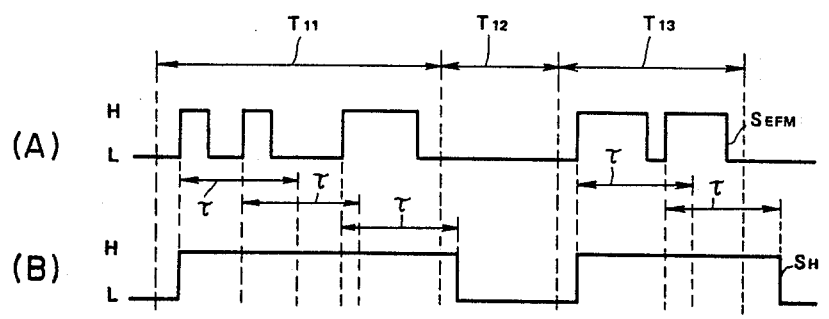
FIG. 10 contains two waveforms used in explaining the operation of a modified form of the high-speed-traverse detection circuit of FIG. 7.

Although the high-speed-traverse detection circuit 11 is arranged to directly receive the reproduced signal RF for producing the high-speed-traverse detection signal $S_H$, it is to be noted that the invention is not limited in any way to such an arrangement. For example, a signal $S_{EFM}$ obtained by demodulating an EFM modulated data signal may be used to trigger the timer circuit 22 of the high-speed-traverse detection circuit 11 in a manner similar to that described in connection with FIG. 8. The operation of this modification will be apparent from the waveforms (A) and (B) of FIG. 10. Although the low-speed-traverse detection circuit 12 used in this embodiment is of one type as shown in FIG. 9, it is to be noted, of course, that the circuit 12 may be taken in the form of the direct comparison type traverse detection circuit as shown in FIG. 10. In addition, the timer circuit 22 may be replaced with a digital timer circuit employing a programmable counter or the like. In this case, the programmable counter starts counting clock pulses from a predetermined value loaded thereon when it is triggered by the threshold detection signal $S_{TH}$. The high-speed-traverse detection signal $S_H$ changes to its low level when an overflow output is provided from the programmable counter.

Although the access speed indication signal $S_{SP}$ is compared with positive and negative threshold voltage $+V_{THW}$ and $-V_{THW}$ for producing a switching signal $S_{SW}$, it is to be noted that the same result may be obtained by a timer which can compare the time lapse with a time required for the optical head 2 to traverse a predetermined number of recording tracks. In addition, although the invention has been described in connection with a compact disc (CD) type disc unit, it is to be noted that the invention is equally applicable to disc units of other types such as a DC type ROM or the like having an access control apparatus for moving the head for access to a desired recording track.

While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. For use with a disc drive having a head provided for movement with respect to tracks on a disc to produce a reproduced signal containing a data signal, an access control apparatus comprising:

means responsive to a control signal for moving the head in a direction radially of the disc to perform access from one track to another track;

first traverse detector means responsive to the data signal contained in the reproduced signal fed thereto from the head for producing traverse detection pulses, the traverse detector including means responsive to the data signal for producing trigger pulses for respective cycles of the data signal having a magnitude greater than a predetermined value and a timer responsive to each of the trigger pulses for changing to a first state, the timer returning into a second state a predetermined time after each time the trigger pulse occurs;

a counter for counting the traverse detection pulses to accumulate a count corresponding to the number of tracks traversed by the head; and means for producing the control signal in accordance with the count of the counter.

2. The access control apparatus as claimed in claim 1, wherein the predetermined value set in the timer is slightly longer than a longest possible period of the data signal.

3. The access control apparatus as claimed in claim 2, which includes:

means for detecting the speed of movement of the head;

second traverse detector means including a first low pass filter having a first time constant, the first low pass filter having an input coupled to the reproduced signal for producing a first filtered signal, a second low pass filter having a second time constant slower than the first time constant, the second low pass filter having an input coupled to the reproduced signal for producing a second filtered signal, and means for producing second traverse detection pulses each of which is produced when the first filtered signal is greater than the second filter signal; and a switching circuit including means for coupling the first traverse detection pulses to the counter when the speed of movement of the head exceeds a predetermined value and for coupling the second traverse detection pulses to the counter when the speed of movement of the head is less than the predetermined value.

4. The access control apparatus as claimed in claim 2, which includes:

means for detecting the speed of movement of the head;

second traverse detector means including an integrating circuit having an input coupled to the reproduced signal for producing an integrated signal, and means for producing second traverse detection pulses each of which is produced when the integrated signal is greater than a predetermined value; and a switching circuit including means for coupling the first traverse detection pulses to the counter when the speed of movenent of the optical head exceeds a predetermined value and for coupling the second traverse detection pulses to the counter when the speed of movement of the head is less than the predetermined value.

5. For use with a disc drive having a head provided for movement with respect to tracks on a disc to produce a reproduced signal containing a data signal, an access control apparatus comprising:

means responsive to a control signal for moving the head in a direction radially of the disc to perform access from one track; to another track first traverse detector means for producing first traverse detection pulses;

second traverse detection means for producing second traverse detection pulses;

means for detecting the speed of movement of the head to produce a signal indicative of the detected head speed;

switching circuit means for selectively supplying the first or second traverse detection pulses in accordance with the head speed detection signal;

a counter for counting the traverse detection pulses fed thereto from the switching circuit means to accumulate a count corresponding to the number of tracks traversed by the head; and means for producing the control signal in accordance with the count of the counter.

* * * * *